(12) United States Patent
Fukushima et al.

(10) Patent No.: US 8,082,121 B2
(45) Date of Patent: Dec. 20, 2011

(54) INFORMATION PROCESSING DEVICE, INFORMATION PROCESSING METHOD, AND INFORMATION STORAGE MEDIUM

(75) Inventors: Noriyuki Fukushima, Tokyo (JP); Shinichi Hirata, Kanagawa (JP); Koji Kageyama, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 435 days.

(21) Appl. No.: 11/855,901

(22) Filed: Sep. 14, 2007

(65) Prior Publication Data

US 2008/0120057 A1    May 22, 2008

(30) Foreign Application Priority Data

Sep. 21, 2006   (JP) ................................. 2006-256324

(51) Int. Cl.
*G01D 18/00* (2006.01)

(52) U.S. Cl. ...................................................... 702/104

(58) Field of Classification Search .................... 702/104
See application file for complete search history.

(56) References Cited

U.S. PATENT DOCUMENTS

| | | | |
|---|---|---|---|
| 2004/0068367 A1* | 4/2004 | Mitsunaga et al. | 701/209 |
| 2006/0015149 A1* | 1/2006 | Baker | 607/19 |
| 2006/0132675 A1* | 6/2006 | Choi | 349/76 |
| 2007/0126387 A1* | 6/2007 | Takenaka et al. | 318/568.2 |

* cited by examiner

*Primary Examiner* — Tung S Lau
(74) *Attorney, Agent, or Firm* — Fitch, Even, Tabin & Flannery

(57) ABSTRACT

An information processing device acquires an output value in accordance with a state in which an operating device is held, acquires the output value in accordance with a predetermined first holding state of the operating device as a first reference value, acquires the output value in accordance with a predetermined second holding state of the operating device, different from the first holding state, as a second reference value, and calculates a state value indicative of the state in which the operating device is held, which is in accordance with the acquired output value, based on the first reference value and the second reference value.

5 Claims, 11 Drawing Sheets

VERTICAL DIRECTION

VERTICAL DIRECTION

VERTICAL DIRECTION

|  | x AXIS | y AXIS | z AXIS |
|---|---|---|---|
| FIRST REFERENCE STATE | R1x | R1y | R1z |
| SECOND REFERENCE STATE | R2x | R2y | R2z |
| THIRD REFERENCE STATE | R3x | R3y |  |

| PARAMETER SET NUMBER | PARAMETER SET |
|---|---|
| 1 | (P1, P2, P3, P4, P5) |
| 2 | (P1', P2', P3', P4', P5') |
| 3 | (P1", P2", P3", P4", P5") |

# INFORMATION PROCESSING DEVICE, INFORMATION PROCESSING METHOD, AND INFORMATION STORAGE MEDIUM

CROSS REFERENCE TO RELATED APPLICATION

The present application claims priority from Japanese Application No. 2006-256324, filed Sep. 21, 2006, the disclosure of which is hereby incorporated by reference herein in its entirety.

BACKGROUND OF THE INVENTION

1. Field of the Invention

The present invention relates to an information processing device, an information processing method, and an information storage medium for carrying out a process in accordance with the state in which an operating device is held.

2. Description of the Related Art

For example, there is available an information processing device, such as a domestic game machine or the like, for connection to an operating device (a controller) held by the user and carrying out a process in accordance with the user's operation relative to the operating device. Some of these operating devices may have a function for outputting a signal indicative of the state in which the operating device is held (holding state) using an acceleration sensor or a gyro sensor, for example. The information processing device with the operating device having such a function can carry out a process in accordance with the holding state of the operating device when inclined or moved by the user.

However, it is possible that different values may be obtained, as output values, for the same holding state of the operating device, due to individual differences of the operating device and/or a built-in sensor thereof. To address this problem, an output value of a sensor or the like needs to be calibrated for correction in order to know the correct holding state of the operating device based on the output value. In the above, when carrying out some application programs by the information process device, output values of a sensor in accordance with the holding states of the operating device in a required range may need to be corrected to take account of individual differences of the operating device, to thereby improve the accuracy of the corrected state value.

Moreover, since shaking the operating device, or content of an operation (for example, pressing the button on the operating device, or the like) carried out on the operating device, may affect and thereby vary the state value of the operating device, a noise signal due to the variation needs to be filtered out. In the above, however, application of consistent filtering to all state values may adversely affect the user's sense of operability in some situations, because required sensitivity for a user operation may be different from situation to situation depending on the content of the application program carried out by the information processing device.

The present invention has been conceived in view of the above, and one of the objects thereof is to provide an information processing device, an information processing method, and an information storage medium for improving accuracy of a state value to be collected, indicative of the holding states of the operating device in a required range.

According to another object of the present invention, there is provided an information processing device, an information processing method, and an information storage medium for improving the user's operability when carrying out a filtering process relative to the state value indicative of the holding state of the operating device.

SUMMARY OF THE INVENTION

According to one aspect of the present invention, there is provided an information processing device comprising output value acquiring means for acquiring an output value in accordance with a state in which an operating device is held; first reference value acquiring means for acquiring the output value in accordance with a predetermined first holding state of the operating device as a first reference value; second reference value acquiring means for acquiring the output value in accordance with a predetermined second holding state of the operating device, different from the first holding state, as a second reference value; and state value calculation means for calculating a state value indicative of the state in which the operating device is held, which is in accordance with the acquired output value, based on the first reference value and the second reference value.

According to another aspect of the present invention, there is provided an information processing device having application execution means for executing an application program for carrying out a process in accordance with a state in which an operating device is held, comprising state value acquiring means for acquiring state values indicative of the state in which the operating device is held every predetermined period of time, as a state value array; parameter set holding means for holding a plurality of parameter sets including at least one parameter for use in a predetermined filtering process; parameter set selection means for selecting one parameter set from among the plurality of held parameter sets, according to an instruction from the application execution means; and filtering means for carrying out the predetermined filtering process relative to the state value array acquired, using the selected parameter set, wherein the application execution means carries out a process using the state value acquired as a result of the filtering process.

According to still another aspect of the present invention, there is provided an information processing method comprising a step of acquiring an output value in accordance with a state in which an operating device is held; a step of acquiring the output value in accordance with a predetermined first holding state of the operating device as a first reference value; a step of acquiring the output value in accordance with a predetermined second holding state of the operating device, different from the first holding state, as a second reference value; and a step of calculating a state value indicative of the state in which the operating device is held, which is in accordance with the acquired output value, based on the first reference value and the second reference value.

According to still another aspect of the present invention, there is provided a computer readable information storage medium storing a program for causing a computer to function as output value acquiring means for acquiring an output value in accordance with a state in which an operating device is held; first reference value acquiring means for acquiring the output value in accordance with a predetermined first holding state of the operating device as a first reference value; second reference value acquiring means for acquiring the output value in accordance with a predetermined second holding state of the operating device, different from the first holding state, as a second reference value; and state value calculation means for calculating a state value indicative of the state in which the operating device is held, which is in accordance with the acquired output value, based on the first reference value and the second reference value.

DESCRIPTION OF THE PREFERRED EMBODIMENTS

In the following, one embodiment of the present invention will be described with reference to the accompanying drawings.

Figure 1:
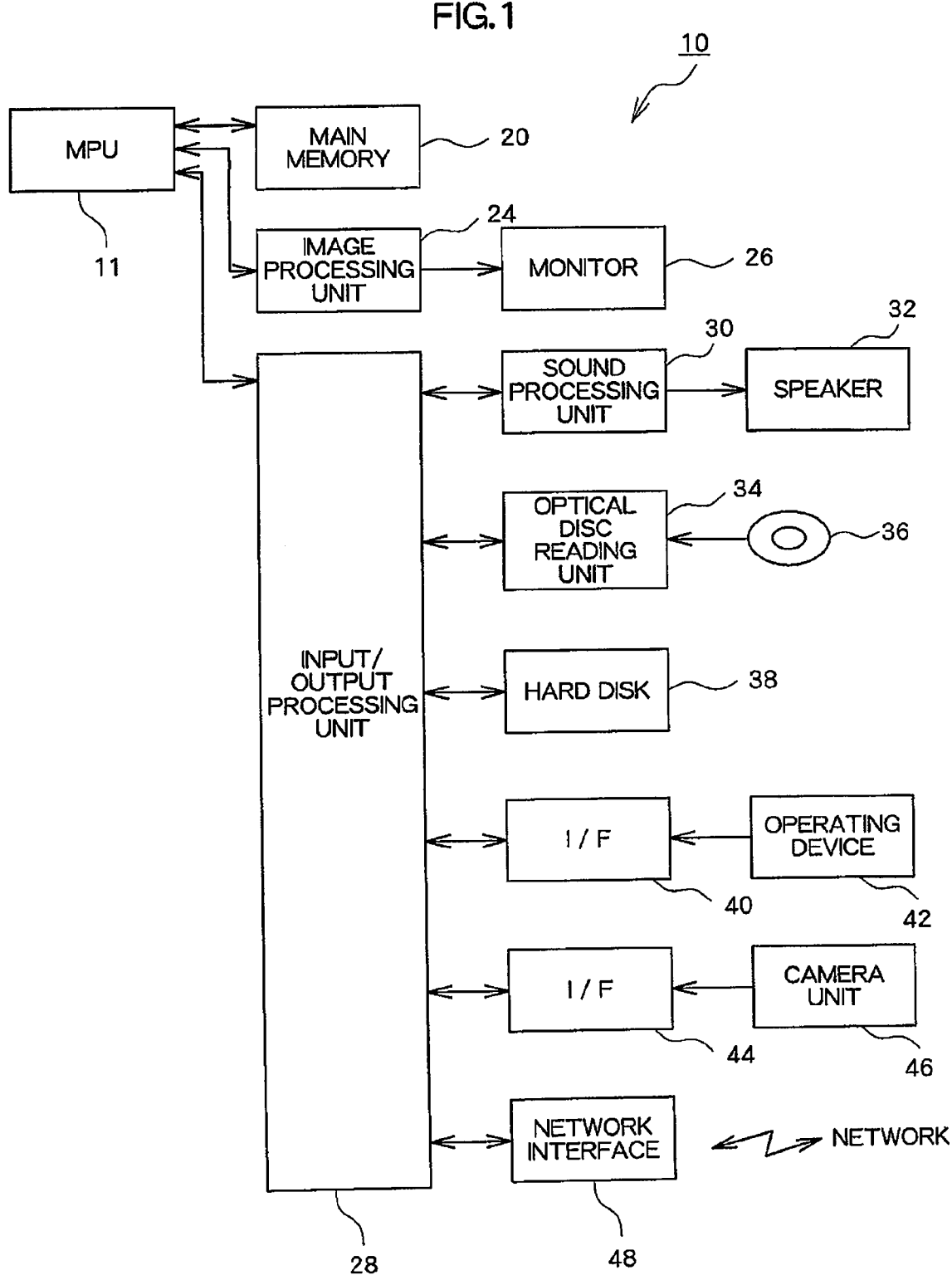
FIG. 1 is diagram showing a hardware structure of an entertainment system according to an embodiment of the present invention.

FIG. 1 is a diagram showing a hardware structure of an entertainment system (an information processing device) according to this embodiment. As shown, the entertainment system 10 is a computer system comprising an MPU (Micro Processing Unit) 11, a main memory 20, an image processing unit 24, a monitor 26, an input/output processing unit 28, a sound processing unit 30, a speaker 32, an optical disc reading unit 34, a hard disk 38, interfaces (I/F) 40, 44, an operating device 42, a camera unit 46, and a network interface 48.

Figure 2:
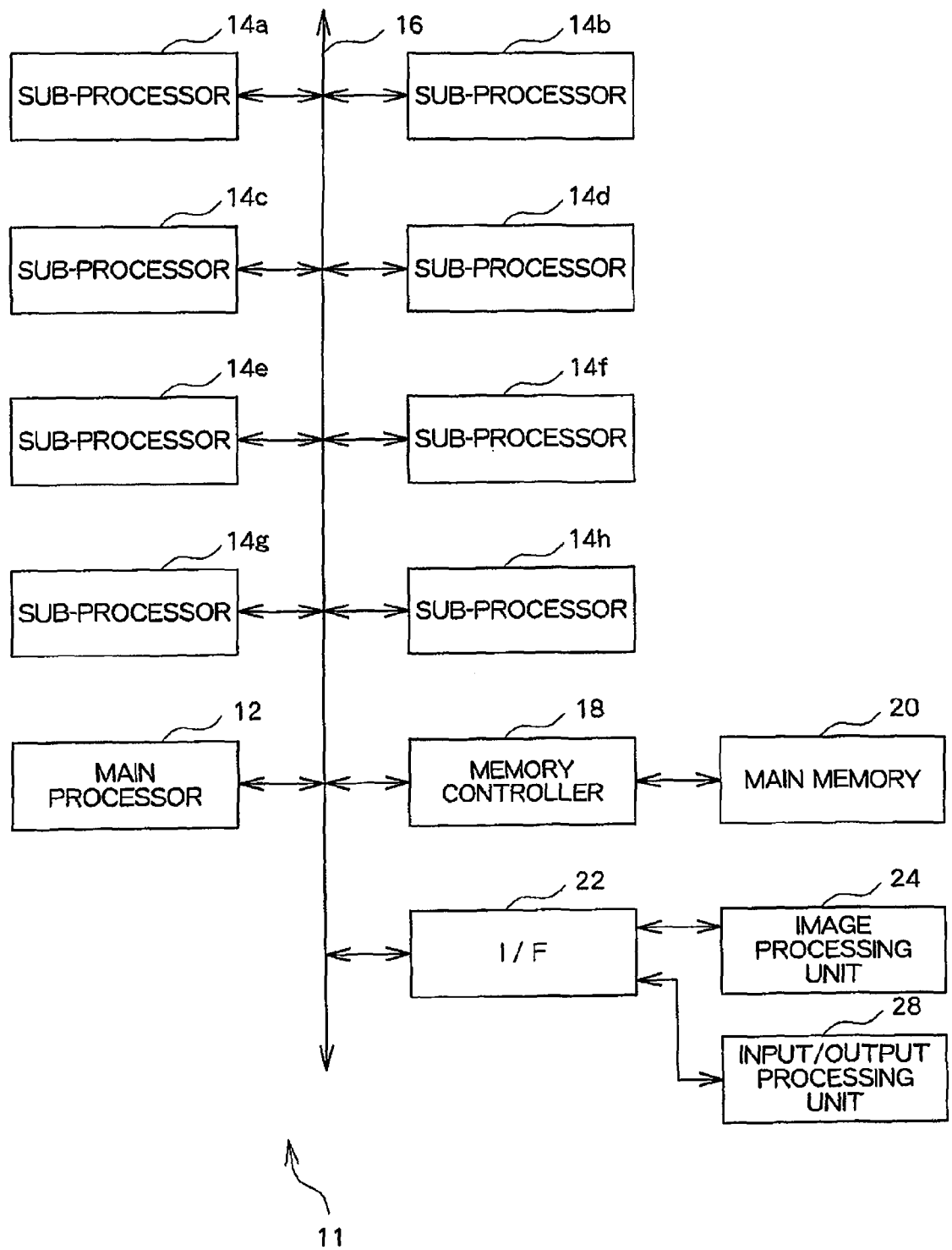
FIG. 2 is a diagram showing details of a structure of an MPU.

FIG. 2 is a diagram showing a structure of the MPU 11. As shown, the MPU 11 comprises a main processor 12, sub-processors 14a, 14b, 14c, 14d, 14e, 14f, 14g, 14h, a bus 16, a memory controller 18, and an interface (I/F) 22.

The main processor 12 carries out various information processes, and controls the sub-processors 14a to 14h based on an operating system stored in the ROM (Read Only Memory) (not shown), a program and data read from an optical disc 36, such as a DVD (Digital Versatile Disk)-ROM or the like, for example, and/or a program, data, and so forth supplied via a communication network.

The sub-processors 14a to 14h each carry out various information processes according to an instruction from the main processor 12, and control the respective units of the entertainment system 10 according to a program and data read from the optical disc 36, such as a DVD-ROM or the like, or supplied via a communication network.

The bus 16 is used for exchanging an address and/or data among the respective units of the entertainment system 10. The main processor 12, the sub-processors 14a to 14h, the memory controller 18, and the interface 22 are mutually connected via the bus 16 for data exchange.

The memory controller 18 accesses the main memory 20 according to an instruction from the main processor 12 and the sub-processors 14a to 14h. A program and data read from the optical disc 36 and/or the hard disk 38, or those supplied via a communication network, are written into the main memory 20, when necessary. The main memory 20 also functions as a working memory of the main processor 12 and the sub-processors 14a to 14h.

The image processing unit 24 and the input/output processing unit 28 are connected to the interface 22. Data exchange between the main processor 12 and the sub-processors 14a to 14h and the image processing unit 24 or the input/output processing unit 28 is carried out via the interface 22.

The image processing unit 24 comprises a GPU (Graphical Processing Unit) and a frame buffer. The GPU renders various screen images in the frame buffer based on the image data supplied from the main processor 12 and the sub-processors 14a to 14h. The screen image rendered in the frame buffer is converted into a video signal at a predetermined timing, and output to the monitor 26. It should be noted that the monitor 26 may be a home-use television receiver.

A sound processing unit 30, an optical disc reading unit 34, a hard disk 38, interfaces 40, 44, and a network interface 48 are connected to the input/output processing unit 28. The input/output processing unit 28 controls data exchange between the main processor 12 and the sub-processors 14a to 14h and the sound processing unit 30, the optical disc reading unit 34, the hard disk 38, the interface 40, 44, and the network interface 48.

The sound processing unit 30 comprises an SPU (Sound Processing Unit) and a sound buffer. Various sound data, including game music, game sound effects, messages, and so forth, which are read from the optical disc 36 and the hard disk 38, are stored in the sound buffer. The SPU reproduces the various sound data, and outputs via the speaker 32. It should be noted that the speaker 32 may be a built-in speaker of a home-use television receiver.

According to an instruction from the main processor 12 and the sub-processors 14a to 14h, the optical disc reading unit 34 reads a program and data from the optical disc 36. The entertainment system 10 may be able to read a program and data stored in any computer readable information storage medium other than the optical disc 36.

The optical disc 36 is a typical optical disc (a computer readable information storage medium), for example, such as a DVD-ROM or the like. The hard disk 38 is a typical hard disk device. The optical disc 36 and the hard disk 38 store various programs and data in a computer readable manner.

The interfaces (I/F) 40, 44 establish connection to various peripheral devices, such as an operating device 42, a camera unit 46, and so forth. The interface may include a USB (Universal Serial Bus) interface, for example. A radio communication interface, such as a Bluetooth interface, for example, may also be used.

The operating device 42 is a general purpose operation input means and is used by the user to input various operations (for example, a game operation). The input/output processing unit 28 scans the states of the respective units of the operating device 42 every predetermined period of time (for example, 1/60 second), and supplies an operation signal about the scanning result to the main processor 12 and the sub-processors 14a to 14h. The main processor 12 and the sub-processors 14a to 14h determine the content of the operation by the user, based on the operation signal. It should be noted that the entertainment system 10 is adapted to be capable of connection to a plurality of operating devices 42, so that the main processor 12 and the sub-processors 14a to 14h can carry out various processes based on the operation signals supplied from the respective operating devices 42.

The camera unit 46 comprises a publicly known digital camera, for example, and supplies a captured black/white, grey scale, or color image every predetermined period of time (for example, 1/60 second). In this embodiment, the camera unit 46 inputs a captured image in the form of JPEG (Joint Photographic Experts Group) image data. The camera unit 46 is mounted to the monitor 26, for example, with the lens thereof directed towards the player, and connected via a cable to the interface 44. The network interface 48 is connected to the input/output processing unit 28 and the communication network, relaying data communication by the entertainment system 10 via the communication network to other entertainment system 10.

Figure 3:
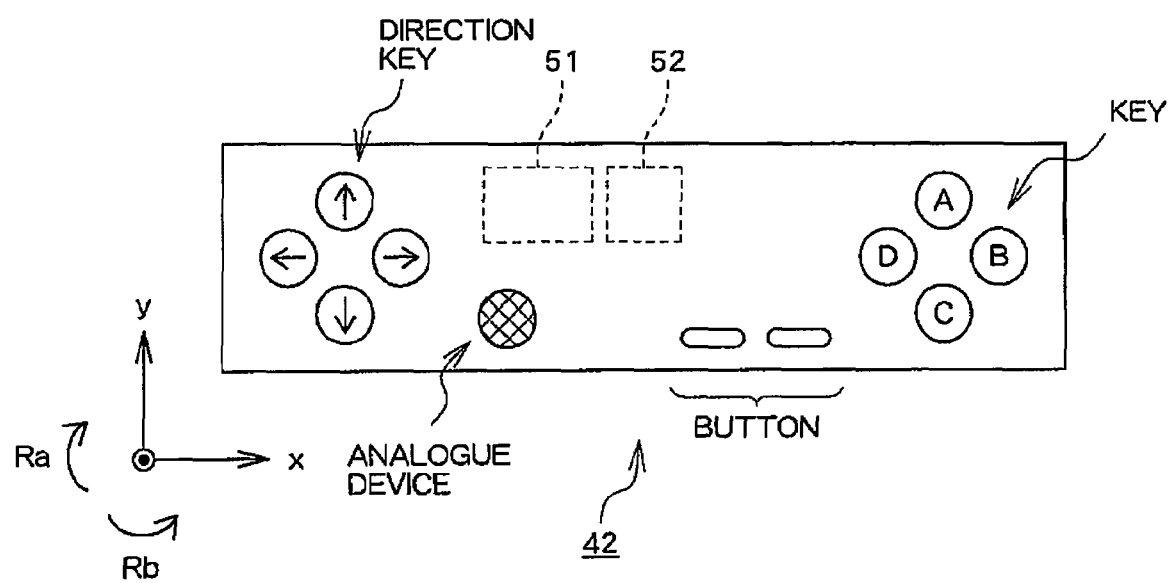
FIG. 3 is a diagram showing an example of the external appearance of an operating device.

In this embodiment, the operating device 42 has means (for example, a motion sensor or the like, for detecting the posture and movement of the operating device 42) for outputting a signal indicative of the state in which the user holds the operating device 42. Specifically, the operating device 42 has a direction key, an analogue device, an operation button, and other keys (represented by "A" to "D" in the drawing) formed on the front surface thereof, as shown in FIG. 3, and incorporates an acceleration sensor 51 and a gyro sensor 52. The acceleration sensor 51 and the gyro sensor 52 each output a signal (a sensor signal) indicative of the holding state of the operating device 42, to be described later. In this embodiment, sensor signals output from the acceleration sensor 51 and the gyro sensor 52 are voltage signals.

Figure 4:
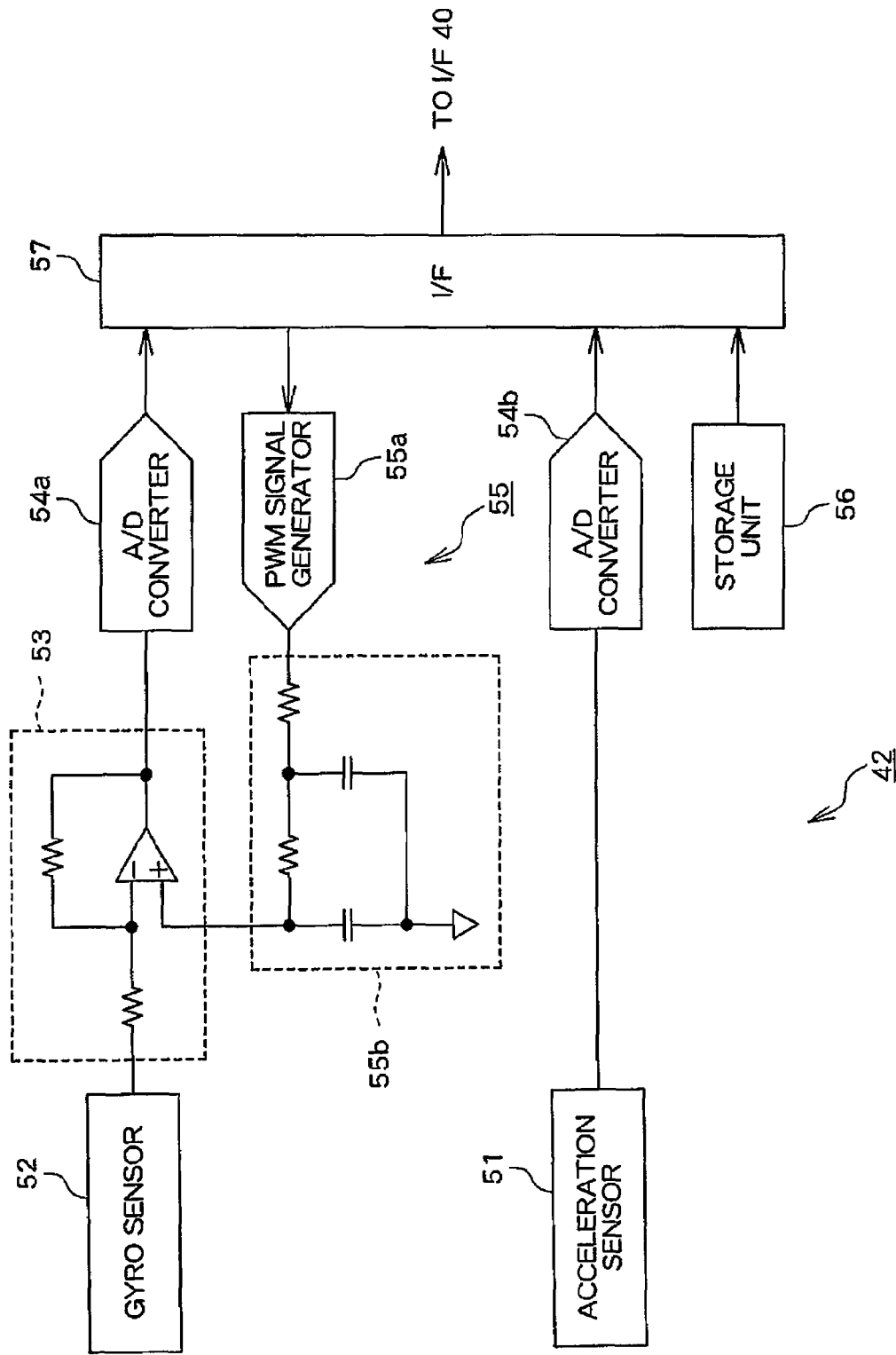
FIG. 4 is a diagram showing an example of the internal structure of the operating device.

FIG. 4 is a diagram schematically showing an internal circuit structure of the operating device 42. As shown, the operating device 42 comprises an acceleration sensor 51, a gyro sensor 52, a signal output unit 53, analogue digital (A/D) converters 54a and 54b, a reference signal input section 55, a storage unit 56, and an interface (I/F) 57.

The acceleration sensor 51 incorporates a weight supported by a beam, and detects the amount of deflection of the beam due to the displacement of the weight caused by the acceleration applied thereto, to thereby determine the acceleration applied to the weight. The acceleration sensor 51 may be a triaxial acceleration sensor for detecting accelerations in mutually substantially orthogonal triaxial directions. Specifically, as shown in FIG. 3, the acceleration sensor 51 is fixedly disposed inside the enclosure of the operating device 42, with three reference axes, namely the x, y, and z axes, set thereon mutually orthogonal to the acceleration sensor 51. Here, for example, the x axis may correspond to the longitudinal direction (the right-left direction) of the operating device 42; the y axis may correspond to the depth direction (the front-back direction) of the operating device 42; and the z axis may correspond to the width direction (the direction perpendicular to the paper surface in FIG. 3) of the operating device 42. The acceleration sensor 51 detects acceleration relative to each of the three reference axes, and outputs three voltage signals in accordance with the detected accelerations as sensor signals.

Figure 5:
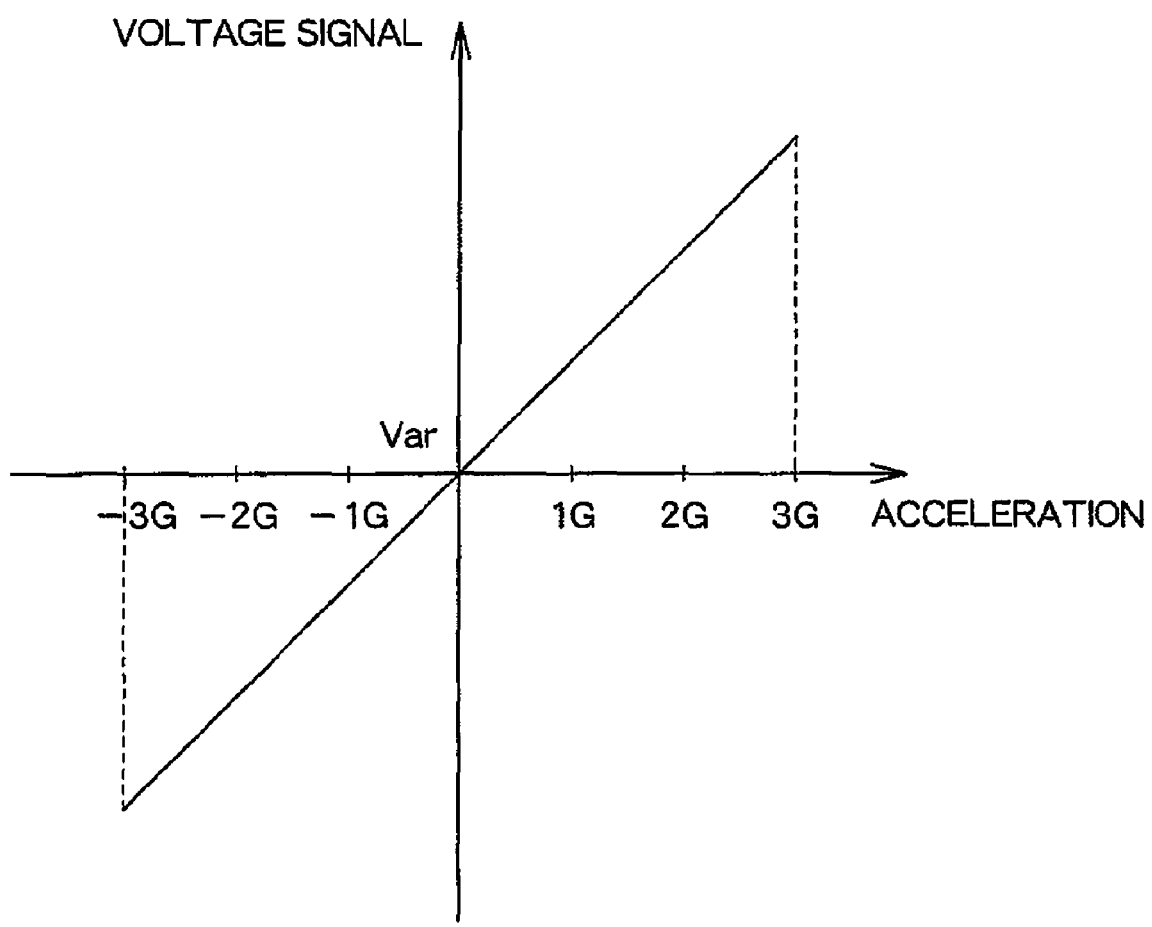
FIG. 5 is a graph showing an example of a voltage signal output from an acceleration sensor.

FIG. 5 is a graph schematically showing the correspondence between the acceleration relative to any of the three axes, detected by the acceleration sensor 51, and a voltage signal output according to the detected acceleration. As shown, the acceleration sensor 51 outputs a voltage signal substantially proportional to the acceleration, and outputs a reference voltage signal Var with no acceleration detected. Based on whether the output voltage signal is larger or smaller than the reference voltage signal Var, which of the positive and negative directions with respect to each axis the acceleration is caused in can be determined. In the drawing, 1G represents an acceleration corresponding to the gravitational acceleration.

The gyro sensor 52 determines an angular velocity of the operating device 42 rotating about the z axis (the gyro reference axis), and outputs a sensor signal in accordance with the determined angular velocity. For example, the gyro sensor 52 is a piezoelectric vibration-type gyro sensor which vibrates a piezoelectric element and detects vibration caused in accordance with the Coriolis force caused by the rotating piezoelectric element. In the following, a voltage signal output with no angular velocity detected by the gyro sensor 52 (that is, the operating device 42 not rotating about the z axis) is referred to as a reference sensor signal Vgr.

The entertainment system 10 can determine in which direction with respect to the z axis the operating device 42 rotates, based on whether a sensor signal from the gyro sensor 52 is higher or lower than the reference sensor signal Vgr, similar to the case with the acceleration sensor 51. Specifically, a voltage signal higher than the reference sensor signal Vgr is output when the operating device 42 rotates in the Ra direction (the clockwise direction on the paper surface) in FIG. 3, while a voltage signal lower than the reference sensor signal Vgr is output when the operating device 42 rotates in the Rb direction (the counter-clockwise direction on the paper surface) in FIG. 3. The entertainment system 10 samples an output from the gyro sensor 52 every fixed period of time, and integrates the sampled outputs, to thereby determine the amount of displacement (a rotational angle) in rotation of the operating device 42 relative to the z axis.

The signal output unit 53 outputs a signal (an output signal) in accordance with the difference between a sensor signal from the gyro sensor 52 and a predetermined reference signal. For example, the signal output unit 53 is an amplifying circuit having a circuit structure as shown in FIG. 4, and outputs a voltage signal as the output signal, the voltage signal obtained by amplifying the potential difference between a voltage signal from the gyro sensor 52 and a predetermined voltage signal (hereinafter referred to as an amplification reference signal Vr). A signal amplified by the signal output unit 53 is input to the A/D converter 54a.

The amplification by the amplification circuit is necessary when a sensor signal from the gyro sensor 52 has only low sensitivity relative to the angular velocity (that is, a voltage signal from the sensor varies less). Here, if the amplification reference signal Vr differs largely from the reference sensor signal Vgr, the sensor signal from the gyro sensor 52 is resultantly amplified asymmetrically relative to the reference sensor signal Vgr. Consequently, with a large difference, in particular, the sensor signal may possibly be amplified to an extent in excess of the expected voltage variation range of the circuit, so that the amplification is accordingly not properly carried out. To address the above, the amplification reference signal Vr input to the amplifying circuit needs to be controlled according to the reference sensor signal Vgr. The method for controlling the amplification reference signal Vr in this embodiment will be described later.

The A/D converters 54a and 54b convert an analogue signal, such as a voltage signal, or the like, into a digital output signal in a predetermined range. In this embodiment, the A/D converter 54a converts the amplified voltage signal from the signal output unit 53 into a digital output signal, and outputs to the interface 57. The A/D converter 54b converts three voltage signals in accordance with the accelerations for the respective reference axes from the acceleration sensor 51 into digital output signals, and outputs to the interface 57. It should be noted here that the digital output signals from the A/D converters 54a and 54b both have ten-bit resolution, and can take any value in the range between 0 and 1023.

The reference signal input section 55 obtains a predetermined reference digital signal Dr via the interface 57, and inputs a voltage signal in accordance with the obtained reference digital signal Dr as an amplification reference signal Vr to the signal output unit 53. The reference signal input section 55 comprises a PWM (Pulse Width Modulation) signal generator 55a and a smoothing circuit 55b in this embodiment.

The PWM signal generator 55a obtains a reference digital signal Dr from the reference signal control unit 62b to be described later via the interface 57, then produces a voltage signal (PWM signal) subjected to pulse width modulation using a duty ratio in accordance with the obtained reference digital signal Dr, and outputs the PWM signal to the smoothing circuit 55b. It should be noted that the reference digital signal Dr input to the PWM signal generator 55a has eight-bit resolution, and can take any value in the range between 0 and 255.

The smoothing circuit 55b is a low pass filter having a circuit structure such as is shown in FIG. 4, for example, and smooths a PWM signal produced by the PWM signal generator 55a. Consequently, a voltage signal in accordance with the reference digital signal Dr is produced, and input to the signal output unit 53 as an amplification reference signal Vr.

Here, it should be noted that the above described structure of the reference signal input section 55 is only an example, and the reference signal input section 55 may have an alternative structure for converting the reference digital signal Dr into an amplification reference signal Vr, using a means, such as a digital/analogue converter, or the like, different from the above-described structure, before outputting to the signal output unit 53.

The storage unit 56 is an EEPROM (Electronically Erasable and Programmable Read Only Memory), or the like, and stores data having been written therein when manufacturing the operating device 42. The data stored in the storage unit 56 is read via the interface 57, and used in a process by the MPU 11 of the entertainment system 10. The content of the data stored in the storage unit 56 in this embodiment will be described later.

The interface 57 may be a USB interface, a Bluetooth interface, or the like, and relays data transmission between the interface 40 and the operating device 42.

In the following, a function realized by the entertainment system 10 having the above-described hardware structure by carrying out a process in accordance with the holding state of the operating device 42, using sensor signals output from the acceleration sensor 51 and gyro sensor 52, will be described.

Figure 6:
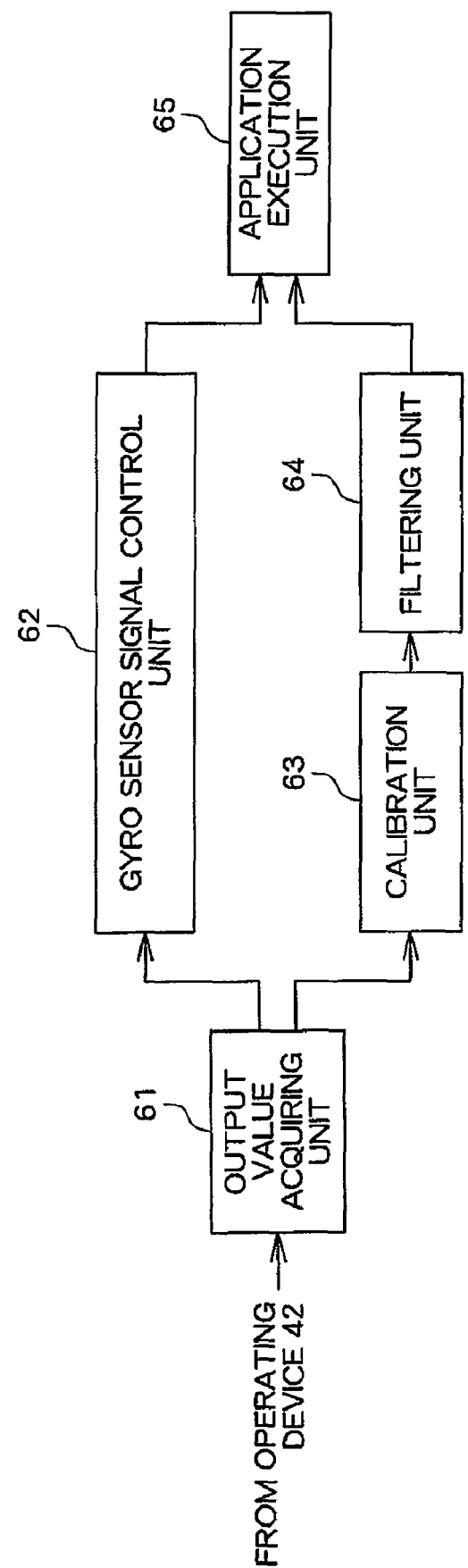
FIG. 6 is a functional block diagram showing an example of an entertainment system function according to the present invention.

FIG. 6 is a functional block diagram showing example functions realized by the entertainment system 10 in this case. As shown, the entertainment system 10 comprises, in terms of functions, an output value acquiring unit 61, a gyro sensor signal control unit 62, a calibration unit 63, a filtering unit 64, and an application execution unit 65. These functions are realized, for example, by the MPU 11 operating according to a program stored in the main memory 20. This program may be provided via a communication network, such as the Internet, or the like, or in the form of being stored in various computer readable information storage media, such as an optical disc, a memory card, or the like.

The output value acquiring unit 61 obtains an output value from the operating device 42 in accordance with the holding state of the operating device 42. Specifically, the output value acquiring unit 61 obtains a digital output signal from the A/D converter 54a as an output value Dg, the digital output signal indicating the angular velocity of the operating device 42. Further, the output value acquiring unit 61 obtains three digital output signals from the A/D converter 54b as output values Da, the digital output signals indicating the accelerations of the reference axes relative to the operating device 42. That is, the output value acquiring unit 61 obtains output values via the interface 57 of the operating device 42 and the interface 40 of the main body of the entertainment system 10. In the above, the output value acquiring unit 61 obtains the output values successively every predetermined period of time (for example, every input of a vertical synchronizing signal).

The gyro sensor signal control unit 62 controls the amplification reference signal Vr to be input to the signal output unit 53, using the output value Dg in accordance with an output from the gyro sensor 52 among those obtained by the output value acquiring unit 61. The detailed function of the gyro sensor signal control unit 62 will be described later.

The calibration unit 63 calibrates the output value Da in accordance with an output from the acceleration sensor 51 among those obtained by the output value acquiring unit 61, and outputs a resultant digital value as a state value Ds indicative of the holding state of the operating device 42.

The filtering unit 64 obtains a state value Ds from the calibration unit 63, and filters out the influence due to a noise signal in the state value Ds. The functions of the calibration unit 63 and the filtering unit 64 will be described later.

The application execution unit 65 executes an application program read from the optical disc 36 or the like and stored in the main memory 20, to thereby carry out a game process or the like. Here, the application execution unit 65 carries out a process in accordance with the holding state of the operating device 42 based on the data from the gyro sensor signal control unit 62 and/or the filtering unit 64.

Figure 7:
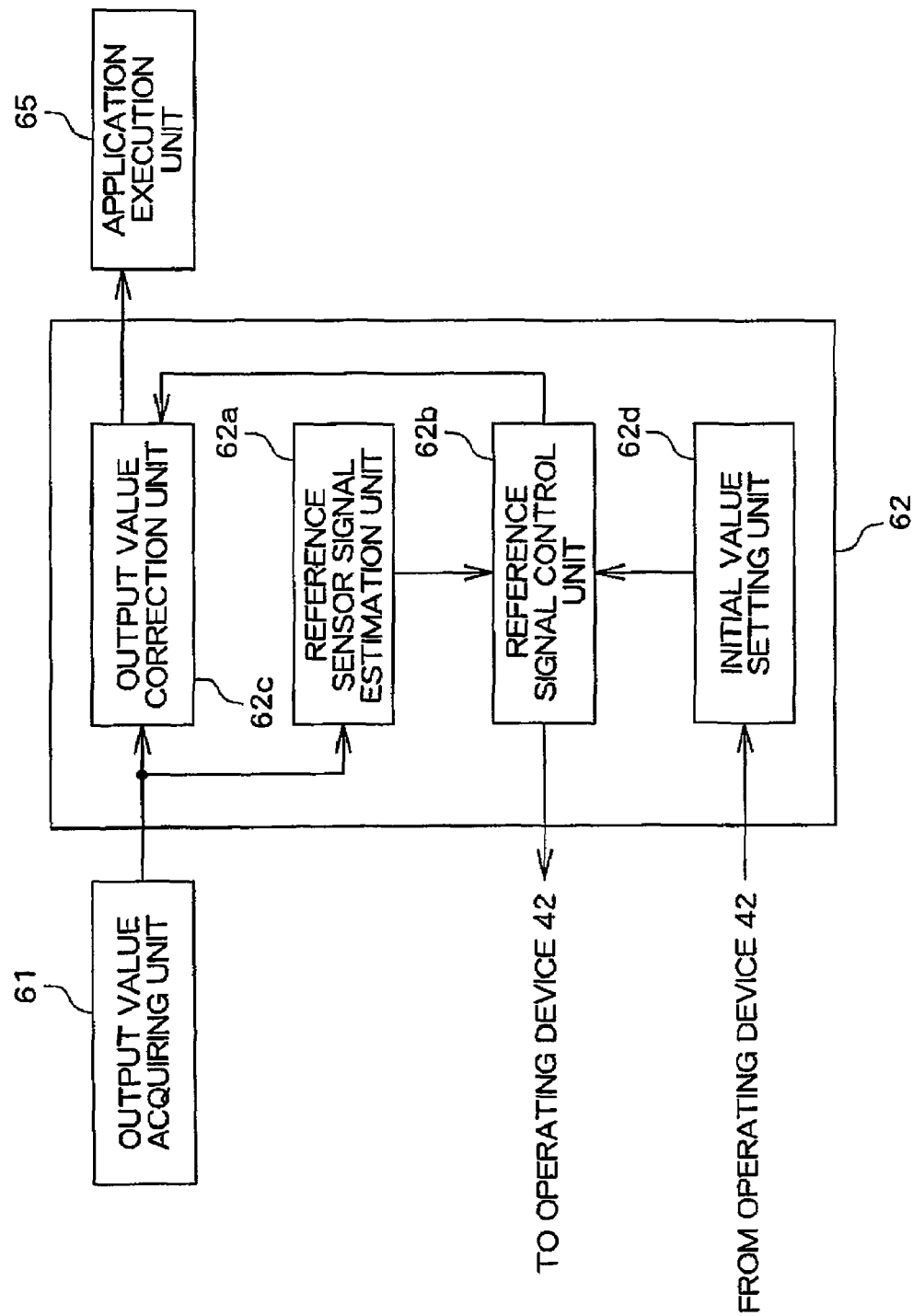
FIG. 7 is a functional block diagram showing an example function of a gyro sensor signal control unit.

In the following, an example function of the gyro sensor signal control unit 62 will be described with reference to the functional block diagram in FIG. 7. As shown, the gyro sensor signal control unit 62 comprises, in terms of functions, a reference sensor signal estimation unit 62a, a reference signal control unit 62b, an output value correction unit 62c, and an initial value setting unit 62d. These functions are realized, for example, by the MPU 11 executing system software stored in the entertainment system 10.

The reference sensor signal estimation unit 62a estimates a reference sensor signal Vgr to be output with no angular velocity detected by the gyro sensor 52, based on a signal from the signal output unit 53. Specifically, the reference sensor signal estimation unit 62a calculates an estimation value (a reference sensor signal estimation value De) of an output value Dg that is output according to the reference sensor signal Vgr and the amplification reference signal Vr to be controlled by the reference signal control unit 62b to be described later, to thereby estimate a reference sensor signal Vgr. The calculation of the reference sensor signal estimation value De by the reference sensor signal estimation unit 62a is made based on an output value array obtained by the output value acquiring unit 61 by obtaining an output value Dg successively every predetermined period of time.

In the following, an example of the above-described calculation of the reference sensor signal estimation value De will be described. That is, the reference sensor signal estimation unit 62a initially selects output values Dg to be processed from among those forming an output value array, and calculates a representative value (for example, an average value) of the selected output values Dg for calculation of the reference sensor signal estimation value De.

More specifically, the reference sensor signal estimation unit 62a calculates a representative value of the output values Dg belonging to each of a plurality of evaluation sections Pn obtained by dividing the output value array into predetermined time sections, and then estimates a reference sensor signal Vgr based on the calculated representative values. In the above, a predetermined number of sampled output values Dg which are successive in the output value array belong to each evaluation section Pn (n=1, 2, 3 . . . ). The reference sensor signal estimation unit 62a calculates an evaluation index En indicative of the flatness (the degree of variation) of the output values Dg belonging to each evaluation section, and, based on the evaluation index En, selects an evaluation section with respect to which a reference sensor signal estimation value De is going to be calculated. Thereafter, a reference sensor signal estimation value De is calculated based on the representative value (the average value, or the like) of the output values Dg belonging to each of the selected evaluation sections.

Figure 8:
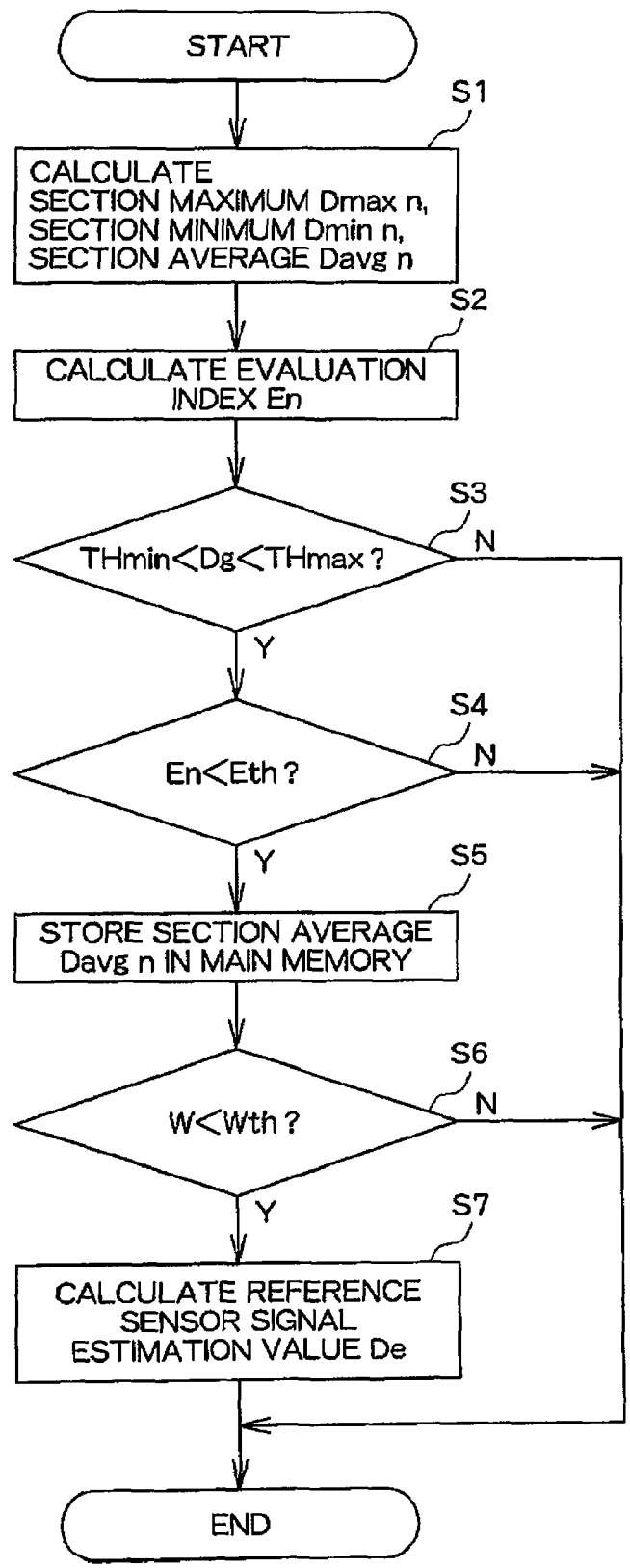
FIG. 8 is a flowchart showing an example of a process carried out by a gyro sensor signal control unit.

In the following, the above-described process will be specifically described with reference to the flowchart in FIG. 8. This process is carried out every time the output value acquiring unit 61 obtains a predetermined number of output values Dg belonging to each evaluation section Pn.

Initially, for an evaluation section Pn to be processed, the reference sensor signal estimation unit 62a obtains the maximum value (the section maximum value) Dmaxn of the output values Dg belonging to the evaluation section Pn, the minimum value (the section minimum value) Dminn of the same, and the average value (a section average value) Davgn of the same (S1). Thereafter, the reference sensor signal estimation unit 62a calculates an evaluation index En, using the following expression, based on the section maximum value Dmaxn, the section minimum value Dminn, and the section average value Davgn (S2).

$$En = (Dmaxn - Davgn)^2 + (Dminn - Davgn)^2$$

In the expression, the evaluation index En is a sum of variance of the section maximum value Dmaxn and the section minimum value Dminn relative to the section average value Davgn. Therefore, the evaluation index En is smaller when the output value Dg for the evaluation section Pn varies less, being closer to constant. In general, the output value Dg is expected to vary more when the user operates the operating device 42, and vary less when the user does not operate the operating device 42. Therefore, the output value Dg which varies less with a smaller evaluation index En is expected to be close to the value which is output in accordance with the reference sensor signal Vgr of the gyro sensor 52.

However, the output value Dg also becomes constant with a resultantly smaller evaluation index En when the angular velocity of the rotating operating device 42 exceeds the measurable range of the gyro sensor 52 and the sensor signal is accordingly saturated at the maximum or minimum value. In view of the above, the reference sensor signal estimation unit 62a determines whether or not the output values Dg belonging to the evaluation section Pn are included in the range between the predetermined upper limit value THmax and the lower limit value THmin (that is, THmin<Dg<THmax) (S3). Should the output value Dg be outside the predetermined range of the threshold, that is, the condition at S3 is not satisfied, the process for the evaluation section Pn is terminated.

Meanwhile, when the condition at S3 is satisfied, the reference sensor signal estimation unit 62a determines whether or not the evaluation index En is smaller than a predetermined threshold Eth (that is, En<Eth) (S4). When it is determined that the evaluation index En is equal to or larger than the threshold Eth, that is, the condition at S4 is not satisfied, the information about that evaluation section Pn is not used in the estimation of a reference sensor signal estimation value De, and the process for the evaluation section Pn is terminated.

Meanwhile, when the determination condition is satisfied at S4, the reference sensor signal estimation unit 62a determines to use the information about that evaluation section Pn in the estimation of a reference sensor signal Vgr. In this case, the reference sensor signal estimation unit 62a stores the section average value Davgn, calculated at step S1, in the main memory 20 as the representative value of the output values Dg for the evaluation section Pn (S5). In the above, it should be noted that it is controlled such that information about the section average values of a predetermined number of evaluation sections are always held in the main memory 20. Therefore, when the predetermined number of section average values are already held, the reference sensor signal estimation unit 62a writes a new section average value into the main memory 20 at step S5, while deleting the oldest one.

Thereafter, the reference sensor signal estimation unit 62a calculates a reference sensor signal estimation value De based on the information about the predetermined number of section average values having been stored in the main memory 20 at step S5. It should be noted here that although a predetermined number of section average values Davgn which satisfy the conditions at steps S3 and S4 are obtained in the above, it is possible that information not corresponding to the reference sensor signal Vgr be included therein. This is because the determination condition at steps S3 and S4 may possibly be satisfied even in a case under peculiar circumstances other than a case in which no angular velocity is detected by the gyro sensor 52. That is, the conditions at steps S3 and S4 may be satisfied when the user slowly moves the operating device 42 at a constant angular velocity, or the like.

To address the above, the reference sensor signal estimation unit 62a determines whether or not the difference W between the maximum and minimum values of the plurality of section average values Davgn having been stored in the main memory 20 at step S5 is smaller than a predetermined threshold Wth (that is, W<Wth) (S6). With the difference W determined to be equal to or larger than the predetermined threshold, the process is terminated. That is, with this arrangement, it is possible to terminate the calculation of a reference sensor signal estimation value De, should the plurality of section average values Davgn vary excessively among one another.

Meanwhile, when the determination condition at S6 is satisfied, the reference digital signal estimation unit 62a calculates the average value of the predetermined number of section average values Davgn having been stored in the main memory 20 at S5, and determines the calculated average value as a reference sensor signal estimation value De (S7).

As described above, even if the reference sensor signal Vgr varies due to the influence of temperature, or the like, while the gyro sensor 52 is being used, the reference sensor signal estimation unit 62a can calculate a reference sensor signal estimation value De in accordance with the varying reference sensor signal Vgr.

It should be noted that the reference sensor signal estimation unit 62a may employ a method different from the one described above in calculation of a reference sensor signal estimation value De. For example, the reference sensor signal estimation unit 62a may calculate a representative value (an average value, or the like) of a plurality of kinds of evaluation section having different lengths of time, and cycles. In the above, where the reference sensor signal estimation unit 62a uses an evaluation section in a relatively short cycle in the calculation of a reference sensor signal estimation value De, the reference sensor signal estimation value De can be updated rather shortly, should the reference sensor signal Vgr vary when the operating device 42 is in use. However, when a sensor output is not stabilized, such as, when the user frequently operates the operating device 42, the frequency of updating the reference sensor signal estimation value De drops. In view of the above, selection of either one of the estimation value obtained in an estimation value calculation process relying on a shorter cycle and that on a relatively longer cycle enables highly accurate calculation of a reference sensor signal estimation value De.

For example, beside the above-described estimation value calculation process, the reference sensor signal estimation unit 62a may use the section average values Davgn, calculated in the estimation value calculation process in a shorter cycle, instead of the output values Dg, and carry out a process similar to the estimation value calculation process in a shorter cycle. This constitutes an estimation value calculation process using an evaluation section in a longer cycle, corresponding to an estimation value calculation process applied relative to an output value array filtered by a low-pass filter. When the reference sensor signal estimation value De is updated in an estimation value calculation process relying on a shorter cycle, the result of the estimation value calculation process relying on a longer cycle is controlled to be reset (that is, the information about the average values of evaluation sections in a longer cycle accumulated thus far is deleted). Meanwhile, when update of a reference sensor signal estimation value De in an estimation value calculation process relying on a shorter cycle is not applied for a predetermined period of time, a reference sensor signal estimation value De obtained in an estimation value calculation process relying on a longer cycle is output to the reference signal control unit 62b. With the above, the reference sensor signal estimation value De is updated using a process relying on a shorter cycle, which closely follows the reference sensor signal Vgr, when possible, and a process relying on a longer cycle when not possible.

It should be noted that the application execution unit 65 may instruct the user at a predetermined time to hold the operating device 42 still so that the reference sensor signal estimation unit 62a can calculate a reference sensor signal estimation value De. With the user holding the operating device 42 still in response to the instruction, the reference sensor signal estimation unit 62a can quickly and accurately calculate a reference sensor signal estimation value De.

Also, in the above-described example, the reference sensor signal estimation unit 62a estimates a reference sensor signal Vgr based solely on the output values Dg, which is in accordance with an output from the gyro sensor 52 and obtained by the output value acquiring unit 61, though any other information may be used in the estimation. For example, the reference sensor signal estimation unit 62a may obtain information about a user operation carried out relative to the operating device 42, including an output from a sensor, such as the acceleration sensor 51, or the like, other than the gyro sensor 52, information showing the state of a button or the like on the operating device 42, and estimate a reference sensor signal Vgr based on the information about the user operation relative to the operating device 42.

Specifically, the reference sensor signal estimation unit 62a selects output values Dg for use in the calculation of a reference sensor signal estimation value De based on the information about the user operation carried out by the operating device 42 and the evaluation index En. This makes it possible to select output values of the gyro sensor 52 for use in the estimation of the reference sensor signal Vgr according to the state of the operating device 42, so that the estimation accuracy can be improved. Further, the reference sensor signal estimation unit 62a may estimate the reference sensor signal Vgr based on a period of time in which the operating device 42 is used and information about the content of the process carried out by the application execution unit 65.

The reference signal control unit 62b controls so as to change the amplification reference signal Vr to be input to the signal output unit 53, according to a reference sensor signal Vgr estimated by the reference sensor signal estimation unit 62a. Specifically, the reference signal control unit 62b determines the value of a reference digital signal Dr in accordance with the reference sensor signal estimation value De, calculated by the reference sensor signal estimation unit 62a, and inputs the reference digital signal Dr to the reference signal input section 55 via the interface 57 of the operating device 42, to thereby control the amplification reference signal Vr.

Specifically, the reference signal control unit 62b changes the reference digital signal Dr in accordance with the reference sensor signal estimation value De such that the output value Dg obtained in accordance with the reference sensor signal Vgr coincides with the predetermined target value Dc. That is, the reference signal control unit 62b changes the reference digital signal Dr being currently output, according to the difference between the reference sensor signal estimation value De and the predetermined target value Dc. With the above, the output value Dg to be output under control by the reference signal control unit 62b becomes substantially coincident with the predetermined target value Dc when a reference sensor signal Vgr is output from the gyro sensor 52. Consequently, the output value Dg takes a value indicative of the variation of the angular velocity, with the target value Dc as the center of the amplitude.

In this case, the target value Dc is set, for example, at the median (here 512) of the range of values which can be taken by the digital output signal from the A/D converter 54a. Alternatively, the target value Dc may be a value determined in response to an instruction from the application execution unit 65.

Here, when the resolution of the reference digital signal Dr and the accuracy of the amplification reference signal Vr accordingly output by the reference signal input section 55 are sufficiently high, it is possible to make fine adjustment such that an output value Dg to be output in accordance with the reference sensor signal Vgr becomes accurately coincident with the target value Dc. However, there may be a case in which only roughly accurate control is possible with an amplification reference signal Vr due to circuit structural constrictions or the like, and in such a case combination of the adjustment of the reference digital signal Dr and correction of the output value Dg, using the method described below, makes possible fine adjustment of the output value Dg in accordance with the reference sensor signal estimation value De.

For example, in this embodiment, suppose that the signal output unit 53 is an amplifying circuit for amplifying the potential difference between two voltage signals input by a factor of −A. In this case, the following relational expression is held between a sensor signal Vg from the gyro sensor 52 and an output signal Vo from the signal output unit 53.

$$Vo-Vr=-A(Vg-Vr)$$

This relational expression is modified as follows:

$$Vo=-A \cdot Vg+(A+1)Vr$$

With the above relational expression, the change amount of the output signal Vo is (A+1) times the change amount of the amplification reference signal Vr.

Further, as described above, in this embodiment, the resolution of the digital output signal (that is, an output value Dg), output from the A/D converter 54a in accordance with the output signal Vo, is ten bits, while the resolution of the reference digital signal Dr, input to the reference signal input section 55, is eight bits. The amplification reference signal Vr is controlled according to the reference digital signal Dr. The ratio between the resolution of the output value Dg and that of the reference digital signal Dr is 4:1 (two bits ×2).

With the above, in this embodiment, the change amount of the output value Dg is 4(A+1) times the change amount of the reference digital signal Dr. That is, the following relational expression is held between the change amount ΔDr of the reference digital signal Dr and the change amount ΔDg of the output value Dg in accordance with the change amount ΔDr.

$$\Delta Dg=4(A+1)\Delta Dr$$

Here, the rate of the change amount of the output value Dg relative to that of the reference digital signal Dr is defined as a variation rate R in the following. As known from the relational expression, in this embodiment, every time the reference digital signal Dr is changed by one, the output value Dg is changed by R (=4(A+1)). However, "A" is not always an integer value, and when "A" is not an integer value, the change amount ΔDg of the output value Dg takes a value obtained by converting the value obtained using the above expression into an integer value by counting fractions over ½ as one and disregarding the remainder, or the like, for example.

As described above, in this embodiment, it is impossible to control the output value Dg with sufficient accuracy by only changing the reference digital signal Dr. Therefore, for compensation of the adjustment by changing the reference digital signal Dr, the gyro sensor signal control unit 62 corrects the output value Dg. Specifically, the reference signal control unit 62b determines the change amount ΔDr relative to the current value of the reference digital signal Dr based on the variation rate R, and outputs a reference digital signal Dr having been modified according to the determined change amount to the reference signal input section 55. In addition, the reference signal control unit 62b calculates a correction value ΔDg based on the variation rate R, for correcting the difference between an output value Dg assumed to be output relative to the reference sensor signal Vgr in accordance with a new reference digital signal Dr and an output value Dg (a target value Dc, here) to be output relative to the reference sensor signal Vgr estimated by the reference sensor signal estimation unit 62a.

For example, the reference signal control unit 62b calculates the change amount ΔDr of the reference digital signal Dr and the correction value ΔDg so as to satisfy the follow relational expression.

$$Dc-De=R \cdot \Delta Dr+\Delta Dg$$

wherein ΔDr is an integer value which enables ΔDg having an absolute value smaller than R. For example, a quotient obtained by dividing Dc-De by R is ΔDr with the remainder being ΔDg. Then, the reference signal control unit 62b outputs, as a new reference digital signal Dr, a value obtained by adding ΔDr to the reference digital signal Dr being currently output, and updates the correction value ΔDg stored in the main memory 20 to the calculated value. In this case, the output value Dg assumed to be output relative to the reference sensor signal Vgr in accordance with the new reference digital signal Dr input is De+R·ΔDr. It should be noted that, when the absolute value of Dc-De is smaller than R, the reference signal control unit 62b updates the correction value ΔDg, without changing the reference digital signal Dr.

The output value correction unit 62c corrects the output value Dg obtained by the output value acquiring unit 61, based on the correction value ΔDg, calculated by the reference signal control unit 62b and stored in the main memory 20. That is, after the reference signal control unit 62b changes the reference digital signal Dr, the correction value ΔDg is added to an output value Dg which is output in accordance with the change, to thereby correct the output value Dg. This makes it possible to correct the output value Dg such that an output value Dg, obtained relative to the reference sensor signal Vgr, becomes substantially coincident with the target value Dc.

In this embodiment, the corrected output value is output to the application execution unit 65. The application execution unit 65 integrates the difference between the corrected output value and the target value Dc, to thereby obtain information about a rotational angle of the operating device 42.

The initial value setting unit 62d obtains the initial value of the reference digital signal Dr, and outputs the obtained initial value to the reference signal control unit 62b. In the above, the initial value setting unit 62d reads data from the storage unit 56 of the operating device 42 when the power of the entertainment system 10 is turned on, or when the operating device 42 is connected to the entertainment system 10, to thereby obtain the initial value of the reference digital signal Dr. With the initial value obtained by the initial value setting unit 62d, the reference signal control unit 62b determines a reference digital signal Dr in accordance with the initial value, and outputs the determined reference digital signal Dr to the reference signal input section 55.

Besides the initial value of the reference digital signal Dr, the initial value setting unit 62d obtains the initial value of the correction value ΔDg to be used by the output value correction unit 62c in correction of the output value Dg, and stores in the main memory 20.

In this embodiment, the reference digital signal Dr is controlled in accordance with the changing output value Dg as time passes. Accordingly, it may take time, in the case of the initial value being a predetermined value, such as 0, or the like, before the reference digital signal Dr is adjusted to be the value in accordance with the reference sensor signal Vgr. To address the above, in this embodiment, the reference digital signal Dr is controlled in accordance with the initial value of the reference digital signal Dr, stored in advance in the storage unit 56 of the operating device 42.

In this case, the initial value of the reference digital signal Dr, stored in the storage unit 56, is determined such that a digital output signal from the A/D converter 42a becomes closest to the target value Dc when the operating device 42 remains still. This is achieved through measurement of a digital output signal from the A/D converter 42a while holding the operating device 42 still and changing the reference digital signal Dr, in the process of manufacturing the operating device 42 or the like. Also, the difference between the digital output signal to be output relative to the initial value of the reference digital signal Dr in this case and the target value Dc is determined as the initial value of the correction value ΔDg.

Through the process described above, the gyro sensor signal control unit 62 controls the reference signal to be input to the signal output unit 53, according to the reference sensor signal Vgr estimated based on an output signal from the signal output unit 53, whereby a sensor signal from the gyro sensor 52 can be converted into an output signal having the amplitude center fixed at a predetermined value (target value Dc, here) which is not subjected to the individual difference of a sensor. Consequently, the application execution unit 65 can obtain accurate information about a rotational angle of the operating device 42 relative to the gyro reference axis by means of integration of the obtained output signal.

Figure 9:
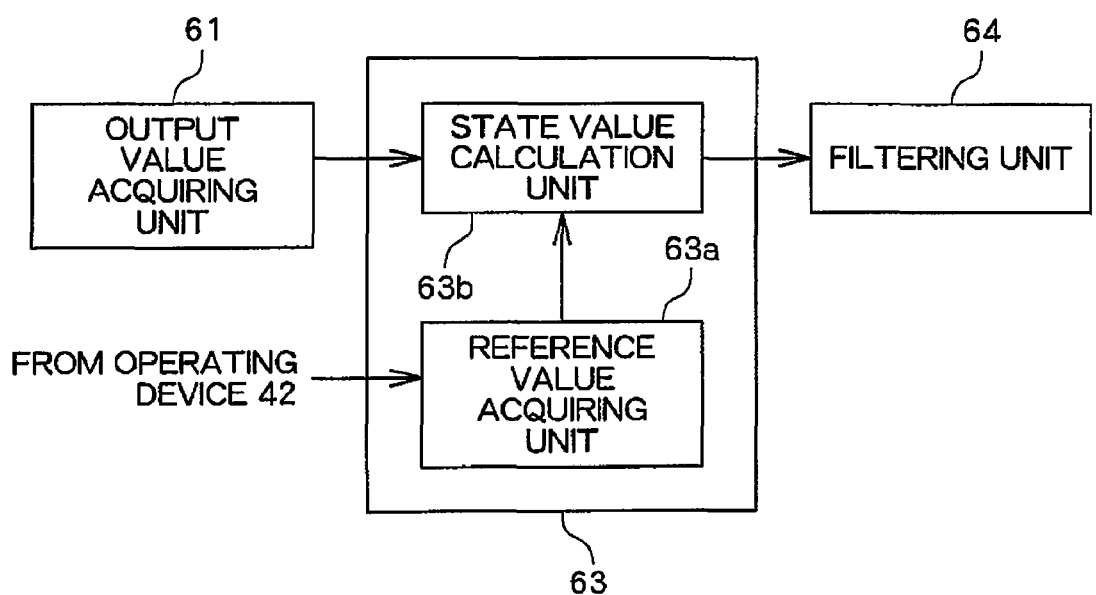
FIG. 9 is a functional block diagram showing an example of a function of a calibration unit.

In the following, an example function of the calibration unit 63 will be described based on the functional block diagram in FIG. 9. As shown, the calibration unit 63 comprises, in terms of functions, a reference value acquiring unit 63a and a state value calculation unit 63b. These functions are realized, for example, by the MPU 11 executing system software stored in the entertainment system 10.

The reference value acquiring unit 63a obtains an output value in accordance with a predetermined holding state (a reference state) of the operating device 42 as a reference value. The reference value is obtained, for example, by measuring a sensor output while holding the operating device 42 in the reference state during manufacture thereof, and stored in the storage unit 56. Specifically, the reference value acquiring unit 63a reads data from the storage unit 56, for example, when the power of the entertainment system 10 is turned on, or when the operating device 42 is connected to the entertainment system 10, to thereby obtain the reference value. The read reference value is stored in the main memory 20.

Here, a specific example of a reference value to be stored in the storage unit 56 will be described. The reference value to be stored in the storage unit 56 contains an output value (a first reference value) in accordance with a predetermined first holding state (a first reference state) of the operating device 42 and an output value (a second reference value) in accordance with a second predetermined holding state (a second reference state) which is different from the first reference state. The first and second reference states are determined based on the range of holding states of the operating device 42 that particularly requires accuracy of an output value.

The storage unit 56 may additionally contain an output value (a third reference value) in accordance with a predetermined third holding state (a third reference state). In this case, for example, the third reference state is a holding state between the first and second reference states, and indicates a standard holding state of the operating device 42, such as a state with no acceleration detected by the acceleration sensor 51. It should be noted that, when the standard holding state of the operating device 42 coincides with either the first or second reference state, the storage unit 56 does not necessarily hold the third reference value corresponding to the third reference state.

These reference states are determined in advance with respect to each of the plurality of kinds of output value to be calibrated by the calibration unit 63. In this embodiment, three kinds of output value in accordance with the accelerations of the three reference axes, to be measured by the acceleration sensor 51, are to be calibrated. Therefore, a plurality of reference states are defined with respect to each of the three reference axes. An output value in accordance with the reference state of each reference axis is measured, and stored as a reference value in the storage unit 56.

Figure 10A:
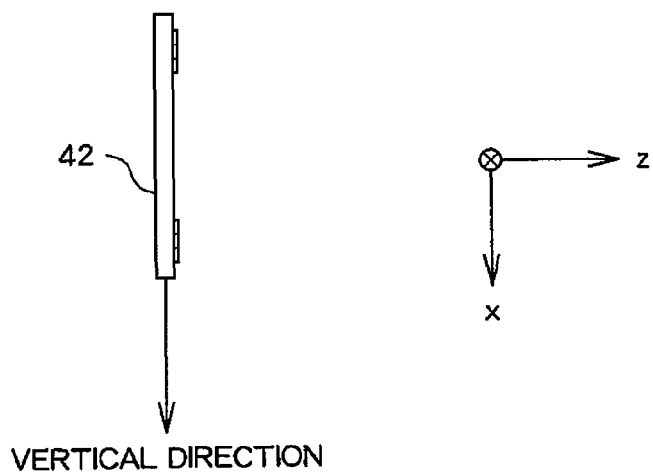
FIGS. 10A, 10B and 10C are diagrams explaining examples of predetermined holding states of the operating device.
Figure 10B:
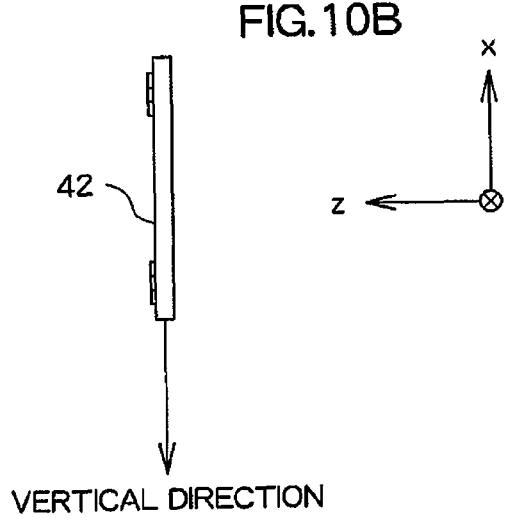
Figure 10C:
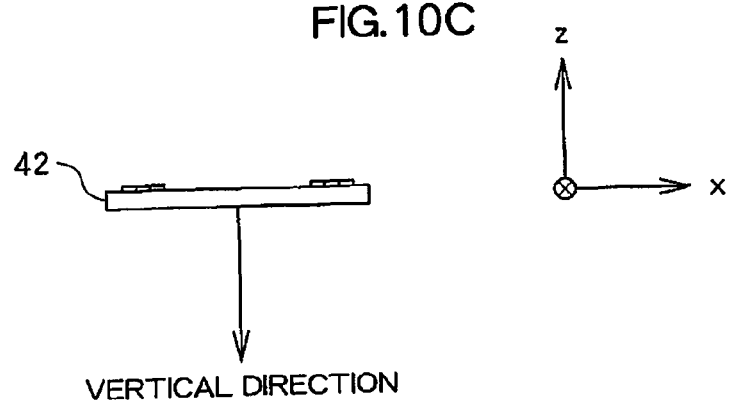

Specifically, in connection with an output value in accordance with the acceleration of each of the x and y axes, a state in which the positive direction of each axis coincides with the vertical direction (the gravity direction) is referred to as a first reference state, with a first reference value being an output value in accordance with the gravitational acceleration of +1G. A state in which the negative direction of each axis coincides with the vertical direction is referred to as a second reference state, with a second reference value being an output value in accordance with the gravitational acceleration of −1G. Further, a state in which each axis is perpendicular to the vertical direction is referred to as a third reference state, with a third reference value being an output value in accordance with the gravitational acceleration of 0G. FIGS. 10A, 10B, and 10C explain examples of reference states for an output value in accordance with the acceleration of the x axis. FIG. 10A shows the first reference state, FIG. 10B shows the second reference state, and FIG. 10C shows the third reference state. All three drawings show the operating device 42 shown in FIG. 3, viewed in the positive direction of the y axis. The state shown in FIG. 10C is the third reference state for the y axis.

As to an output value in accordance with the acceleration of the z axis, a state in which the z axis is perpendicular to the vertical direction is referred to as a first reference state, with the first reference value being an output value in accordance with the gravitational acceleration of 0G. A state in which the negative direction of the z axis coincides with the vertical direction is referred to as a second reference state, with the second reference value being an output value in accordance with the gravitational acceleration of −1G.

Figures 11, 12, 13:
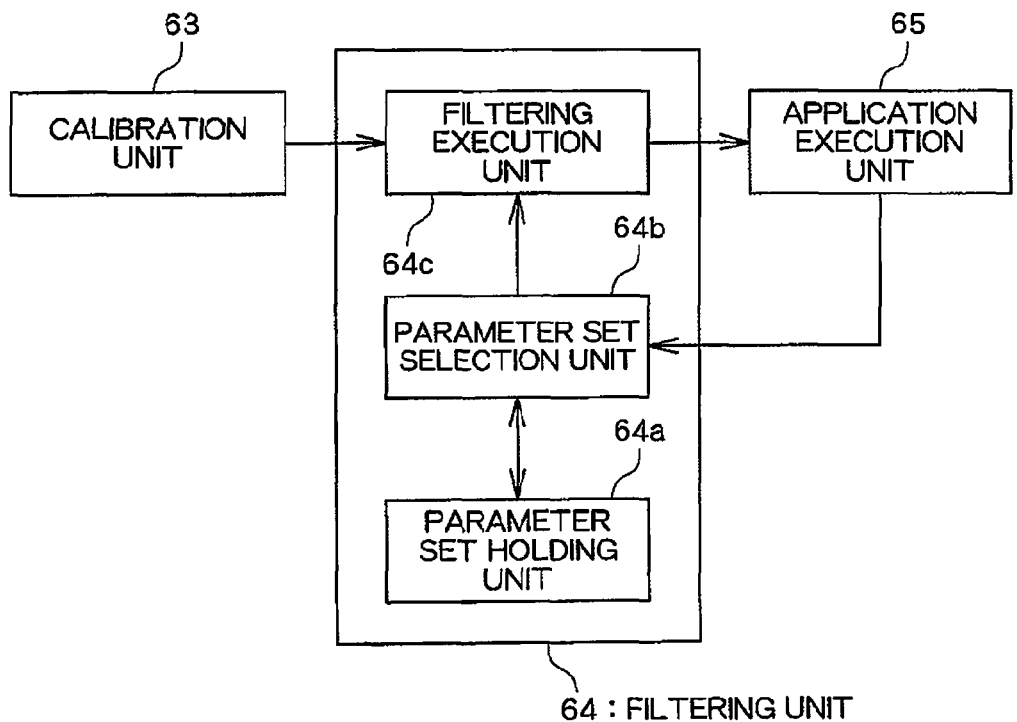
FIG. 11 is a diagram explaining an example of reference values stored in a storage unit of the operating device.
FIG. 12 is a functional block diagram showing an example of a function of a filtering unit.
FIG. 13 is a diagram explaining one example of a plurality of parameter sets held by the entertainment system according to the embodiment.

FIG. 11 explains an example of reference values stored in the storage unit 56 of the operating device 42 in the above-described example. In this example, no third reference state is available for the z axis because it is considered that the user rarely inclines the operating device 42 upside down, and therefore, accurate measurement in the range between −1G and +1G for the x and y axes and the range between −1G and 0G for the z axis is required when the acceleration sensor 51 is used to detect the degree of inclination of the operating device 42.

The state value calculation unit 63b calculates, and outputs, a state value Ds indicative of the holding state of the operating device 42 in accordance with an output value Da, based on the output value Da, acquired by the output value acquiring unit 61, and the first and second reference values, acquired by the reference value acquiring unit 63a and stored in the main memory 20. That is, the state value calculation unit 63b calculates a state value Ds every time the output value acquiring unit 61 obtains an output value Da, and outputs the state value Ds, or the output value Da subjected to correction. It should be noted that the state value calculation unit 63b may calculate a state value Ds, additionally using the third reference value.

Here, the calculation of a state value Ds by the state value calculation unit 63b (a state value calculation process) will be specifically described. Initially, calculation of a state value Ds by correcting an output value Da in accordance with the acceleration of the x axis will be described. In this case, the state value calculation unit 63b carries out linear interpolation using the calculation expression below and the first and second reference values, to thereby calculate a state value Ds.

$$Ds = \frac{C1x}{R1x - R2x}(Da - R3x) + C2x \qquad (1)$$

wherein R1x, R2x, and R3x respectively represent the first, second, and third reference values, and C1x and C2x respectively represent predetermined correction parameters.

With the operating device 42 in the third reference state (the state corresponding to the gravitational acceleration 0G), the output value Da is assumed to take a third reference value R3x. In this case, the state value Ds calculated in the state value calculation process takes a fixed value C2x. Therefore, even when the third reference value R3x varies due to the individual differences of the sensors or the like, the state value calculation unit 63b always outputs the value C2x as a state value indicative of the third reference state of the operating device 42. The value C2x is set at the median (512, here) of the range of values which can be taken by a digital signal output from the A/D converter 54b, for example.

The state value Ds, calculated in the state value calculation process, takes a value proportional to the output value Da, with the coefficient C1x/(R1x−R2x) as a proportional constant. As a result, the difference between the state value indicative of the first reference state and the state value indicative of the second reference state takes a predetermined value C1x, irrespective of the individual difference of the sensor or the like. Therefore, even if the output values Da should vary differently between the first and second reference states, relative to the user operation by the same amount due to the individual differences of the sensors or the like, the state value Ds after correction varies constantly relative to the user operation by the same amount. That is, the change amount of the state value Ds relative to that of the gravitational acceleration remains constant. With the above, the state value Ds correctively indicates the holding state of the operating device 42 in the range (the focus range) between the first and second reference states, with the state value C2x indicative of the third reference state, described above, as a reference. Consequently, the accuracy of the state value Ds can be improved.

It should be noted that correction of the output value Da in accordance with the acceleration of the y axis can be achieved using a calculation expression similar to that for the x axis, in which C1y and C2y may be values equivalent to C1x and C2x, respectively.

In the following, correction of an output value Da in accordance with the acceleration of the z axis will be described. In this case, the state value calculation unit 63b calculates the state value Ds, using the following calculation expression.

$$Ds = \frac{C1z}{R1z - R2z}(Da - R1z) + C2z \quad (2)$$

Similar to the expression (1), R1z and R2z indicate the first and second reference values, respectively, and C1z and C2z represent predetermined correction parameters, respectively. According to the expression (2), the first reference value R1z and the second reference value R2z are always corrected to be the fixed values C2z and (C2z−C1z), respectively.

As for the z axis, as described above, the first reference state corresponds to the gravitational acceleration 0G, while the second reference state corresponds to the gravitational acceleration −1G. The range between the first and second reference states corresponds to a half of the focus range in the case of the x and y axes. Therefore, with $$C1z = \frac{1}{2}C1x = \frac{1}{2}C1y$$

it is possible to control such that, for any reference axis, the change amount of the state value Ds becomes constant relative to the same change amount of the gravitational acceleration. Further, in the expression (2), a first reference value is used instead of the third reference value in the expression (1), and the first reference state in connection with the z axis corresponds to the gravitational acceleration 0G, similar to the third reference states in connection with the x and y axes. Therefore, by defining C2z=C2x=C2y, it is possible to control such that the state values Ds in connection with the respective reference axes take the same value with respect to the gravitational acceleration 0G.

When the state value Ds, calculated using the above-described calculation expression, is not included in the range of the values which can be taken by the digital output signal output by the A/D converter 54b, the state value calculation unit 63b may perform correction such that the state value Ds is included in the range. That is, the state value calculation unit 63b corrects such that the calculated state value is included in the range defined by the predetermined upper and lower limits. Specifically, in this embodiment, 0 is output as a state value Ds when the value calculated using the calculation expression is smaller than the lower limit value 0, and 1023 is output when the value exceeds the upper limit value 1023. With the above, it is possible to correct the entire output value Da so as to be included in the range of values which can be taken by the original output value Da, and output as a state value Ds, while ensuring the accuracy of the state value Ds in the focus range. With the above, when an application program is designed based on the assumption, for example, that a digital value having ten-bit resolution is obtained as an output value in accordance with the acceleration, the application execution unit 65 executes the application program intact, to thereby realize a process in accordance with the state value Ds subjected to calibration by the calibration unit 63.

With the above-described function, the calibration unit 63 can calculate a state value Ds, based on the output value Da, obtained by the output value acquiring unit 61, and the first and second reference values, obtained in advance in accordance with the first and second reference states, respectively, to thereby perform correction to absorb individual differences between the operating device 42, while ensuring accuracy of the state value Ds in the required range.

In the following, a functional example of the filtering unit 64 will be described based on the functional block diagram in FIG. 12. As shown, the filtering unit 64 comprises, in terms of functions, a parameter set holding unit 64a, a parameter set selection unit 64b, and a filtering execution unit 64c. The function of the parameter set holding unit 64a can be realized by the main memory 20, or the like. The functions of the parameter set selection unit 64b and the filtering execution unit 64c are realized by the MPU 11 executing a library program, provided in the form of being stored in the optical disc 36 together with the application program, or the like.

The parameter set holding unit 64a holds a plurality of parameter sets, each containing at least one parameter for use in predetermined filtering. Specifically, the parameter set holding unit 64a holds a table showing, in association with each other, a parameter set number and a parameter set which includes a predetermined number of parameters. FIG. 13 is a diagram explaining an example of parameter sets stored in the table.

According to an instruction from the application execution unit 65, the parameter set selection unit 64b selects one parameter set from among those held in the parameter set holding unit 64a. For example, the parameter set selection unit 64b may select a parameter set associated with the parameter set number notified by the application execution unit 65.

The filtering execution unit 64c filters the state value Ds, using the parameter set selected by the parameter set selection unit 64b. Specifically, the filtering execution unit 64c obtains state values Ds, output by the state value calculation unit 63b every predetermined period of time, as a state value array, and filters the state value array.

The filtering by the filtering execution unit 64c is a low-pass filtering process for filtering out a high frequency component in the state value array, for example. In the following, a specific example of low-pass filtering by the filtering execution unit 64c will be described below.

In this case, each parameter set held in the parameter set holding unit 64a contains a parameter which is a filtering coefficient. Suppose that one parameter set comprises parameters P1, P2, P3, P4, and P5. In this case, the low-pass filtering is realized using the following calculation expression.

$$\begin{cases} u[n] = P1 \cdot u[n-1] + P2 \cdot u[n-2] + Ds[n] & (3) \\ Ds'[n] = P3 \cdot u[n] + P4 \cdot u[n-1] + P5 \cdot u[n-2] & (4) \end{cases}$$

Here, Ds[n] represents a state value obtained in the $n^{th}$ sampling, and Ds'[n] represents a state value after being filtered. U[n] is a value temporarily calculated using the expression (3) for every sampling, and u[n]'s for a predetermined number of past times are temporarily stored in the main memory 20 for use in calculation using the expressions (3) and (4). It should be noted that the expressions represent an example of low-pass filtering using a secondary IIR (Infinite Impulse Response) filter. The use of such a filter makes it possible to remove a noise signal without significantly sacrificing the speed at which to respond to the change of the state value Ds relative to the user operation.

In the above example, suppose that the plurality of parameter sets held in the parameter set holding unit 64a correspond to different cut-off frequencies. In this case, frequency components in different ranges are removed through low-pass filtering using the respective parameter sets. Specifically, when a sampling frequency 100 Hz is used to obtain a state value Ds, three sets of filter coefficients, respectively corresponding to the cut-off frequencies 25 Hz, 10 Hz, and 5 Hz, are held as parameter sets. Then, the state value array is filtered using a parameter set selected from among the three parameter sets in response to an instruction from the application execution unit 65, to thereby filter out a frequency component equal to or larger than the cut-off frequency.

With the above, in the entertainment system 10, when accurate sensitively relative to the operation applied to the operating device 42 is not required, such as when a menu screen is shown on the monitor 26 and the user is encouraged to select a menu item, application of filtering using a lower cut-off frequency enables efficient removal of a noise signal from the state value array. On the contrary, when the application execution unit 65 controls the motion of an object (such as a game character, a pointer, or the like) shown on the screen in response to a subtle operation carried out by the user with the operating device 42, for example, filtering using a higher cut-off frequency is applied, so that responsiveness with respect to the user operation, and thus the user operability, can be enhanced.

It should be noted that the filtering unit 64 may filter the three state value arrays indicative of the accelerations for the reference axes, output from the acceleration sensor 51, using either a common parameter set or different parameter sets.

For example, the parameter set holding unit 64a may hold parameter sets corresponding to each of a plurality of kinds of state value array so as to be associated with one parameter set number. In this case, the parameter set selection unit 64b selects one parameter set with respect to each of the plurality of kinds of state value array according to an instruction from the application execution unit 65, and the filtering execution unit 64c filters each of the plurality of kinds of state value array, using the selected parameter set.

With the above, for example, each of the state value arrays indicative of the accelerations for the respective reference axes, output by the acceleration sensor 51, can be subjected to low-pass filtering using different cut-off frequencies. Therefore, in a case where it is expected that a noise signal will be caused with respect to a particular reference axis in a specific direction according to the content of a process carried out by the application execution unit 65 (for example, when the button formed on the specific surface of the operating device 42 is used), the state value array relevant to that reference axis is subjected to low-pass filtering using a lower cut-off frequency, so that a noise signal can be removed under a desired condition. Also, in order to realize a process in accordance with the operating device 42 being inclined by the user in a particular direction, the reference axes other than the reference axis corresponding to that direction are subjected to low-pass filtering using a lower cut-off frequency, so that a noise signal can be removed without deteriorating the sensitivity to the user operation.

The application execution unit 65 carries out a process in accordance with the holding state of the operating device 42, using the state value Ds', obtained through filtering by the filtering unit 64. As described above, by changing the condition of the filtering by the filtering unit 64 according to an instruction from the application execution unit 65, the entertainment system 10 can realize filtering in accordance with the content of the process carried out by the application execution unit 65. This can enhance the user operability.

It should be noted that the present invention is not limited to the above-described embodiment, and various modified embodiments are achievable.

For example, although an example is described in the above in which the main body of the entertainment system 10 functions as an operating device control device for controlling a predetermined reference signal input to the signal output unit 53, the operating device control device may be incorporated into the operating device 42.

When a voltage signal output by the gyro sensor 52 does not need to be amplified by the amplification circuit, or the like, the signal output unit 53 may be realized, for example, by the main body of the entertainment system 10 by carrying out a predetermined program. That is, the signal output unit 53 is realized as software having a function for outputting a digital signal, as an output signal, in accordance with the difference between a digital signal in accordance with the voltage signal output by the gyro sensor 42 and a predetermined reference signal (a digital signal).

Also, although it is described in the above that calibration and filtering are carried out based on an output value Da in accordance with an output of the acceleration sensor 51, the entertainment system 10 may carry out calibration by the calibration unit 63 and filtering by the filtering unit 64 based on an output value Dg in accordance with an output from the gyro sensor 52. In this case, the reference state may not be a state in which the operating device 42 remains still in a predetermined posture, as described above in connection with the acceleration sensor 51, but may be a state in which the operating device 42 rotates at a predetermined angular velocity. Alternatively, the entertainment system 10 may obtain an output value in accordance with the holding state of the operating device 42, using a motion sensor, or the like, for detecting any other posture and motion of the operating device 42, and calibrate and/or filter the output value.

The filtering unit 64 may carry out a different kind of filtering process, and is not limited to filtering using a low-pass filter, relative to a state value array.

What is claimed is:

1. An information processing device, comprising:
   output value acquiring means for acquiring an output value of a sensor in accordance with a physical posture in which an operating device is held;
   first reference value acquiring means for acquiring the output value of the sensor in accordance with a predetermined first physical holding posture of the operating device as a first reference value;
   second reference value acquiring means for acquiring the output value of the sensor in accordance with a predetermined second physical holding posture of the operating device, different from the first physical holding posture, as a second reference value; and
   state value calculation means for calculating a state value indicative of the physical posture in which the operating device is held, which is in accordance with the acquired output value, based on the first reference value and the second reference value.

2. The information processing device according to claim 1, wherein the state value calculation means calculates the state value such that a difference between a state value indicative of the first physical holding posture and a state value indicative of the second physical holding posture becomes a predetermined value.

3. The information processing device according to claim 1, further comprising
   third reference value acquiring means for acquiring the output value in accordance with a predetermined third physical holding posture of the operating device between the first physical holding posture and the second physical holding posture, as a third reference value, wherein
   the state value calculation means calculates the state value based on the third reference value such that a state value indicative of the third physical holding posture becomes a predetermined value.

4. The information processing device according to claim 1, wherein the state value calculation means corrects the state value such that the state value calculated is included in a range between a predetermined upper limit value and a predetermined lower limit value.

5. The information processing device according to claim 1, further comprising:
   application execution means for executing an application program for carrying out a process in accordance with the physical posture in which the operating device is held;
   state value acquiring means for acquiring state values calculated by the state value calculation means every predetermined period of time as a state value array;
   parameter set holding means for holding a plurality of parameter sets including at least one parameter for use in a predetermined filtering process;
   parameter set selection means for selecting one parameter set from among the plurality of held parameter sets, according to an instruction from the application execution means; and
   filtering means for carrying out the predetermined filtering process relative to the acquired state value array, using the selected parameter set,
   wherein
   the application execution means carries out a process using the state value acquired as a result of the filtering process.

* * * * *